United States Patent [19]

Burkett

[11] Patent Number: 4,725,082

[45] Date of Patent: Feb. 16, 1988

[54] COUPLING

[75] Inventor: Leny W. Burkett, North Olmsted, Ohio

[73] Assignee: The Pipe Line Development Company, Westlake, Ohio

[21] Appl. No.: 936,179

[22] Filed: Dec. 1, 1986

[51] Int. Cl.4 .............................................. F16L 21/04
[52] U.S. Cl. ..................................... 285/348; 285/374; 285/404
[58] Field of Search .... 285/404, 348, 321 (U.S. only), 285/374

[56] References Cited

U.S. PATENT DOCUMENTS

| | | | |
|---|---|---|---|
| 2,567,243 | 9/1951 | Smith | 285/348 |
| 2,647,769 | 8/1953 | Smith | 285/348 X |
| 3,028,180 | 4/1962 | Smith | 285/404 X |
| 3,159,414 | 12/1964 | Widman | 285/348 |
| 3,669,475 | 6/1972 | Luckenbill et al. | 285/404 X |
| 3,885,818 | 5/1975 | Ammann | 285/404 X |
| 4,045,054 | 8/1977 | Arnold | 285/321 X |
| 4,291,889 | 9/1981 | Hardcastle | 285/374 X |

Primary Examiner—Thomas F. Callaghan
Attorney, Agent, or Firm—Pearne, Gordon, McCoy & Granger

[57] ABSTRACT

A pipe coupling assembly for plain end pipe of the type in which a packing ring is compressed in an internal groove by a thrust ring to squeeze it against the outer surface of the pipe and effect a seal therewith. The thrust ring is made of a plurality of accurate segments which can be economically produced and assembled in the coupling body. The segments are mechanically interlocked in the body by cooperation with other elements of the assembly to avoid separate retainer members. The segments have a configuration which avoids significant circumferential gaps in the packing compression face of the ring and reduces the necessary axial length of the groove.

5 Claims, 4 Drawing Figures

COUPLING

BACKGROUND OF THE INVENTION

The invention relates to pipe couplings, and more particularly to a type of coupling for plain pipe ends which comprises a circumferentially continuous annular housing body and a packing for sealing on the exterior of a pipe end.

PRIOR ART

A known type of coupling for a plain pipe end takes the form of a cylindrical shell or body which is arranged to slip over the pipe to be coupled. Radially oriented clamping screws projecting through the wall of the body grip the exterior of the pipe to anchor it in the body. A seal between the coupling body and the pipe end is made by an annular packing ring located in an internal groove in the body. The packing is compressed against the exterior surface of the pipe by a thrust ring, also disposed in the internal groove. The thrust ring is forced against the packing to displace it against the pipe surface by axially oriented thrust screws. The thrust screws are threaded into holes arranged about the circumference of an end face of the coupling body.

Manufacture of prior art couplings of the type described has been made difficult and correspondingly expensive by the problem of assembling the thrust ring in the internal coupling body groove. One conventional technique for fabricating the ring has been to roll a flat bar into a hoop and to weld its ends together. The ring, with its ends overlapped to reduce its diameter, is assembled through the end of the body into the groove. Thereafter, the ring is expanded and its ends are welded into a continuous band. Fabrication and assembly of the ring into the body require considerable labor and add significantly to the cost of the coupling. It is particularly difficult to fabricate and assemble rings in this manner for relatively small-sized pipes, e.g., pipe sizes below 8 inches.

An alternative approach, known in the art, is to first fabricate a thrust ring into finished form and then capture it in an internal groove formed by two separate body portions. The body portions, after receiving the ring, are joined and welded circumferentially at the plane of the groove. This latter approach is relatively expensive, since it requires the fabrication of separate body parts and their subsequent assembly with a leakproof weld.

SUMMARY OF THE INVENTION

The invention provides an improved coupling assembly for plain end pipe which reduces manufacturing costs by simplifying fabrication and assembly of its components. A thrust ring of the assembly, in accordance with the invention, is embodied as a plurality of separate segments that are mechanically interlocked in the packing groove. The mechanical interlocking construction assures that the ring segments will not be dislodged or lost during handling, shipment, and installation. The interlocked construction avoids the necessity of welding the ring into an endless hoop or the alternative of welding a coupling body together around a prefinished ring. Ideally, the ring is interlocked in the body by means of elements integral with those regularly used in a coupling assembly so that the expense of separate retainers or fasteners is avoided.

In the preferred embodiment, in assembly the ring is mechanically interlocked by axially sliding the ring segments in the groove into interengagement with complementary surfaces on the body. Thereafter, the segments are locked in place by positioning the packing in the groove so as to block return release movement of the segments.

In the preferred embodiment, the thrust ring segments are provided with integral pins adapted to project into axial holes in the body associated with thrust screws. The pins are of sufficient length to provisionally hold the segments in place during subsequent placement of the packing. Once the packing is put in place, the ring segments are reliably retained within the body. Axial movement of the ring segments is resisted by the packing, and radial movement of the segments is prevented by interengagement of the pins and their receiving holes.

An important feature of the invention is the configuration of the segments which allows them to be assembled in the internal packing groove without interference with one another, without the need for circumferential gaps between them at the plane of engagement with the packing, and without an unnecessary axial length in the packing groove.

DESCRIPTION OF THE PREFERRED EMBODIMENT

Figure 1:
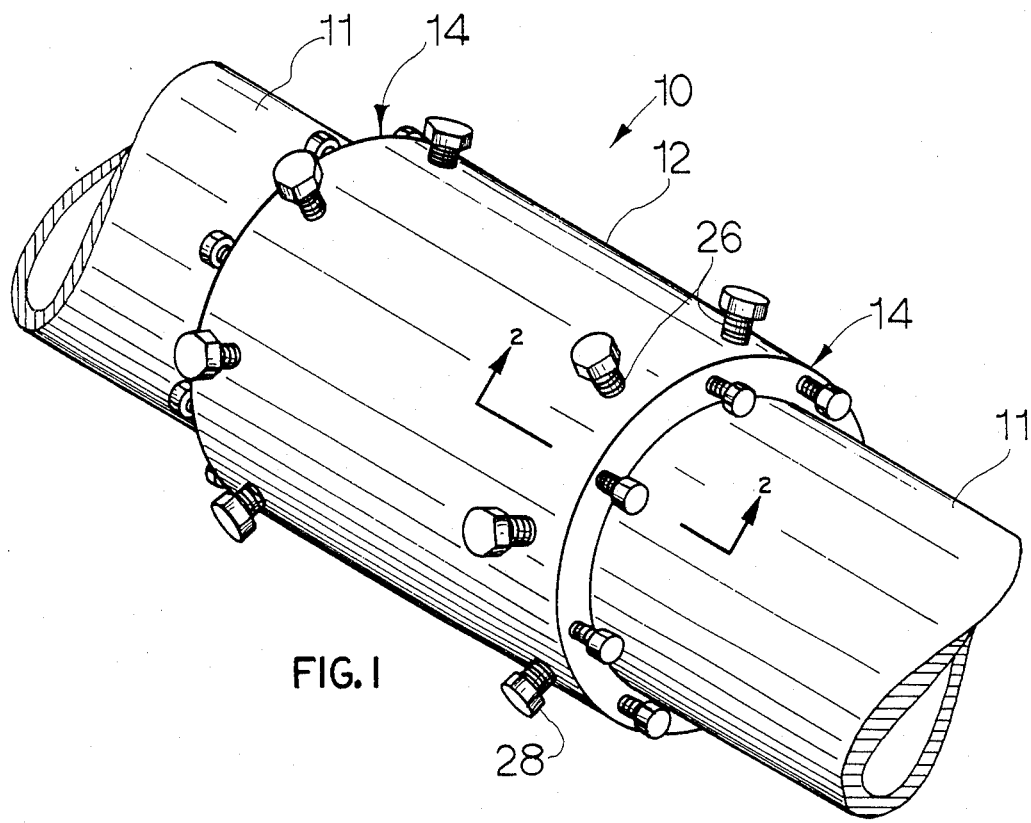
FIG. 1 is a perspective view of a pipe coupling assembly constructed in accordance with the invention joining a pair of pipes.

Referring now to the drawings, there is shown a coupling assembly 10 installed on a pair of lengths of steel pipe or other rigid conduits 11 for carrying fluids. The pipes 11 typically have plain ends, being devoid of threads, flanges, grooves and the like. The coupling assembly 10 is particularly suited for repair and alteration of existing pipe lines, since it can be installed, for example, on a pipe end cut at a desired point along an existing line without further preparation, such as the cutting of threads or welding of a flange on the newly formed pipe end.

Figure 2:
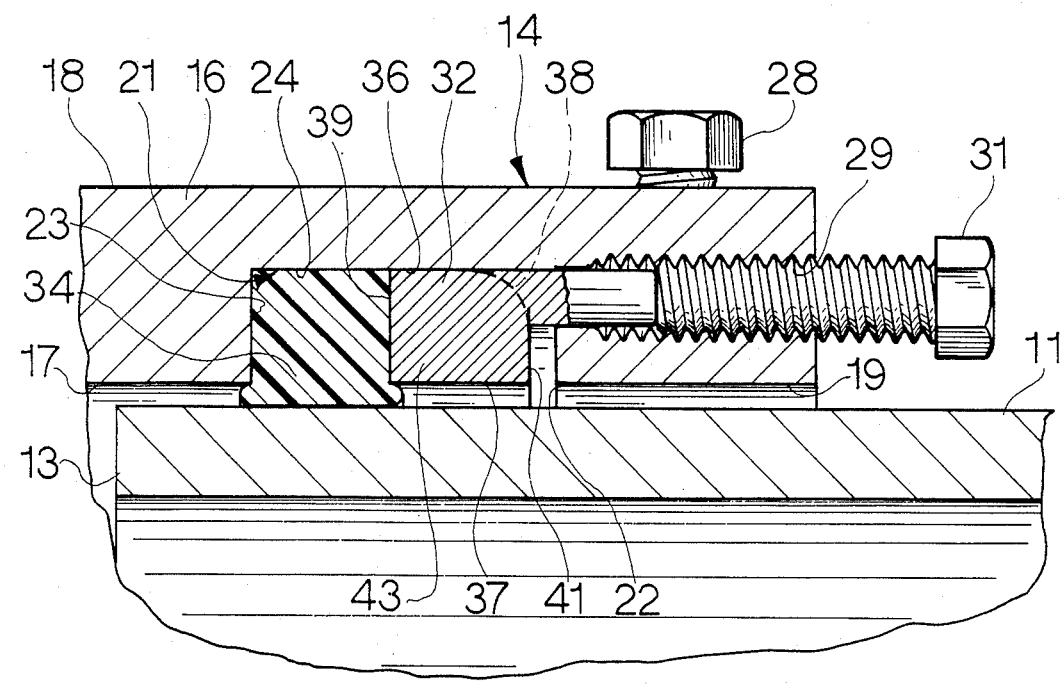
FIG. 2 is a fragmentary cross-sectional view of the coupling taken across the plane indicated by the lines 2—2 in FIG. 1.
Figure 3:
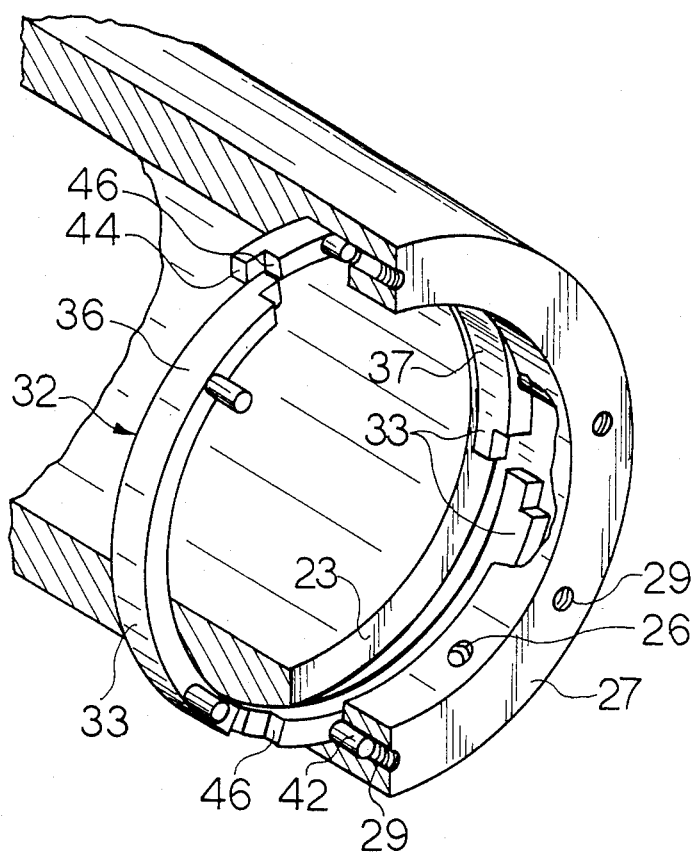
FIG. 3 is a fragmentary, perspective view of the coupling on an enlarged scale illustrating the segments of the thrust ring being assembled in the packing groove.
Figure 4:
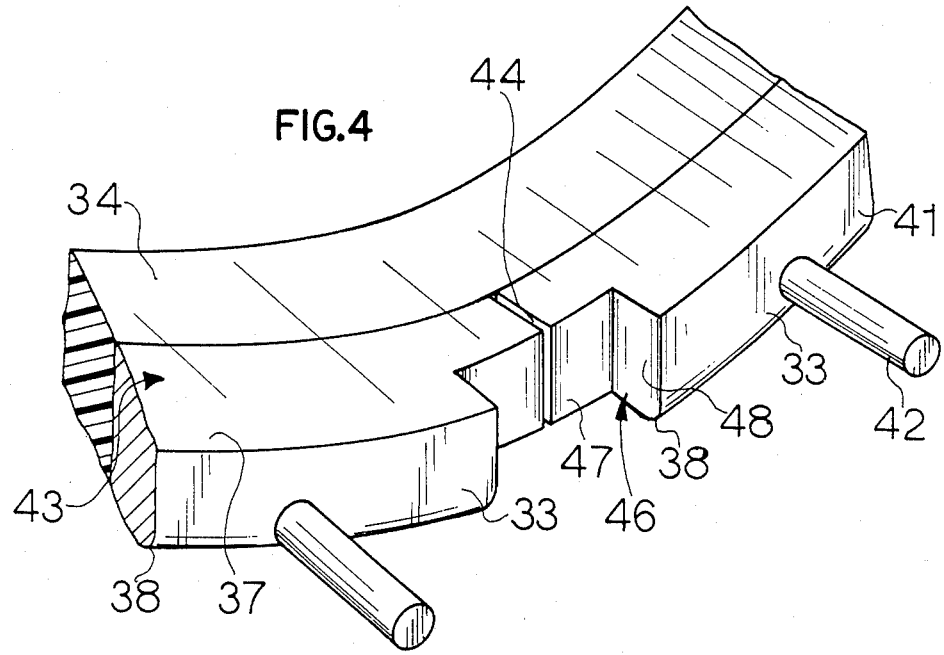
FIG. 4 is a fragmentary, perspective view of the thrust ring segments and the packing in assembled relation.

The coupling assembly 10 includes a cylindrical body or shell 12, preferably fabricated from seamless steel tubing or other suitable material. In the illustrated case, the coupling assembly 10 joins pipe ends 13 of equal diameter, and opposite ends 14 of the coupling assembly 10 are substantially identical. The coupling body 12 has a cylindrical wall 16 radially bounded by an internal cylindrical surface 17 and an external cylindrical surface 18. The internal surface 17 defines a bore 19 in which each pipe end 13 is received. Adjacent each end 14, the coupling body 12 has an internal groove 21 formed in its internal surface 17. The groove 21, as illustrated in FIG. 2, has a rectangular cross section when viewed in a plane radial to the axis of the coupling body 12. The groove includes opposed radial faces 22, 23 and a cylindrical surface 24. In the illustrated case, the radial depth of the internal groove 21 is approximately one-half the thickness of the body wall 16, and the axial length of the groove is approximately three times its radial depth.

A series of radial threaded holes 26 are angularly spaced about the circumference of the coupling body end 14. The holes 26 are situated axially midway between an end face 27 of the coupling body 12 and the adjacent radial groove face 22. Assembled in each of the radial holes 26 is a clamping screw or bolt 28 which is adapted to engage and grip the exterior of the pipe end 13. In the coupling body 12 at angularly spaced points intervening the clamp screw holes 26 are axially oriented, threaded holes 29 extending from the end face 27 to the groove face 22. Assembled in these axial holes 29 are thrust screws 31.

Assembled in the internal groove 21 at a side thereof adjacent the coupling end face 27 is a thrust ring 32 formed of a plurality of arcuate segments 33. In the illustrated case, the segments 33 are three in number and each subtends an arc substantially equal to 120 degrees when viewed along the axis of the coupling body 12. The segments 33 are substantially identical to one another. The thrust ring 32, collectively formed by the segments 33, is adapted to axially compress an elastomeric packing ring 34 assembled in the groove 21 at a side thereof remote from the end face 27. Outer and inner surfaces 36, 37 of the segments 33 have a center of curvature which corresponds to the central axis of the body 12 and such surfaces are generally cylindrical. As indicated in FIG. 2, in a plane radial to its center of curvature, the segments 33 have a generally rectangular cross section with one of their corners or edges 38 being rounded to facilitate installation in the groove 21. A forward or inner face 39 of the segment 33 lies in a radial plane transverse to the axis of the body 12 and is adapted to directly engage and axially compress the packing 34. On a radial face 41 opposite the packing 34, the segment 33 is formed with integral projecting pins 42. The pins 42 are dimensioned smaller than the holes 29 and are arranged to register with and be received in corresponding ones of such holes. In the illustrated case, the pins 42 of each segment 33 are two in number, substantially identical, and generally cylindrical with their axes each parallel to the center of curvature of the segment. Each of the pins 42 has a length at least equal to two of its diameters and is at least as long as one-half the axial length of the main body, designated 43, of the segment 33 measured between the faces 39, 41. The diameter of the pins 42 is dimensioned to provide a relatively loose fit in the thrust screw holes 29. End surfaces 44 of a segment 33 lie in planes radial to the segment's center of curvature and the arcuate length of the segments 33 is dimensioned so that when fully assembled in the groove 21 only a relatively small gap, to ensure against interference, exists between adjacent ones of these surfaces 44.

The total axial length of the segment 33 from the inner front face 39 to a distal end face of the pins is no greater than the axial length of the groove 21 between the surfaces 22, 23. Each arcuate end of the segment is formed with a notch 46 which interrupts the rear face 41 and locally reduces the axial length of the segment in this area. The notch 46 is defined by a surface 47 lying generally in a plane transverse to the center or axis of curvature of the segment 33 and an intersecting surface 48 lying generally in a plane extending radially from such axis. The segments 33 are economically produced as steel castings and can be used in essentially their cast condition.

With the packing 34 not yet installed, the first two of the segments 33 are assembled in the body 12 in a simple manner by inserting them radially into the groove 21 and then drawing them axially rearwardly toward the end face 27 so that their respective pins 42 slip into associated ones of the axial holes 29. Installation of the third or last segment 33 is similarly accomplished with notches 46 providing clearance with the adjacent arcuate ends of the previously installed segments 33. Were the notches 46 not present in the last-installed segment 33, with the segment lengths fully maintained to avoid significant gaps therebetween, this last segment could not be assembled because its ends would interfere with the ends of the adjacent installed segments. For simplicity, all of the segments 33 are provided with notches 46. The notches 46, which in effect reduce the arcuate length of the segments on their axially rearward side, i.e., to the sides associated with the end surface 44, reduce the effective arcuate length of the segments at this point, but do not interrupt the opposite surface 39 which contacts the packing 34. An alternative solution to this interference problem is to increase the axial length of the groove 21 so that it is at least equal to twice that of the main body portions 43 of the segments 33. The axial length of the packing 34 is similarly increased.

Once these segments 33 have all been installed, the packing 34 is positioned in the internal groove 21. Preferably, the packing 34 is a continuous annular ring of suitable elastomeric material having a generally rectangular cross section in a radial plane as shown in FIG. 2. The packing material is sufficiently flexible to allow it to be distorted to pass through the bore 19 into the groove 21, and is sufficiently rigid to reliably retain itself in the groove. With the packing 34 in place, the segments 33 are mechanically locked in place. The packing 34 resists significant forward axial movement of the segmnets 33 in the grooves 21, and interengagement or interlocking between the pins 42 and the surfaces of the axial threaded holes 29 prevents significant radial movement of the segments 33. The assembly of the body 12, thrust ring segments 33, and packing 34 can be safely handled, shipped, and installed without risk of the segments 33 falling out of place.

The coupling assembly 10 is installed by slipping it over the pipe end 13 until the latter is well inward of the packing 34. The clamping screws 28 are tightened against the exterior of the pipe 11 to firmly grip the pipe and prevent it from pulling out of the coupling assembly 10. Thereafter, the thrust screws 31 are turned into their holes 29 to forcibly engage the ends of the pins 42 and drive or jack the segments 33 axially against the packing 34. Since the packing 34 is axially constrained by the opposed groove surface 23 and radially constrained by the outer groove surface 24, the packing is caused to extend radially inwardly against the exterior surface of the pipe end 13. Tightening of the thrust screws 31 continues until the packing 34 forms a fluidtight seal with the pipe exterior. The pipe 11 can be placed into service immediately thereafter. If desired, the coupling assembly 10 can be welded on the pipe at its ends and across the clamping and thrust screws 28, 31 in a known manner. The principles of the invention are adaptable to other pipe coupling and fitting constructions, including those in which pipes of different diameters are joined or in which the packing and thrust ring are provided at only one side of a coupling and the other side is joined to a pipe or vessel in another manner, such as by welding, bolted flanges, or the like.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A pipe coupling comprising an annular circumferentially continuous body having an end face and a circular bore for receiving a plain end of a pipe passing through the zone of said end face, the body including an internal groove concentric with said bore, a series of radially oriented clamp screws passing through associated holes in the body at circumferentially spaced locations axially between the end face and the internal groove, a plurality of axially oriented thrust screws extending through associated holes between said end face and said internal groove intervening said clamp screws, a plurality of arcuate thrust ring segments disposed in said groove and collectively forming an annular, generally radially extending thrust ring face at their sides remote from said end face with gaps of negligible size at the arcuate ends of such segments, each of said segments having a plurality of axially oriented projections associated therewith extending in said axial holes and preventing significant radial inward movement of said segments, and an annular deformable packing member disposed in said groove on a side of said segments remote from said end face and resisting axial displacement of said projections from said axial holes.

2. A pipe coupling comprising a circumferentially continuous annular body, the body having a circular bore for receiving the end of a pipe, an annular packing groove in the body concentric about the circular bore, means for retaining the pipe end in the bore, a deformable packing in the groove, a plurality of arcuate thrust ring segments disposed in said groove and collectively forming an annular thrust ring in the body adjacent the packing, means on the body operable externally of the body for axially jacking the thrust ring towards the packing to axially compress the packing and thereby cause it to constrict radially about the exterior of the pipe and thereby effect a seal therewith, and means on the body and segments for mechanically interlocking the segments in the body, said interlocking means including axially oriented projections and axially oriented recesses for receiving and interengaging said projections by relative movement therebetween in a direction opposite to that developed by said jacking means, said packing, when disposed in said groove, being adapted to resist disengagement of said interlocking means, said interlocking means when interengaged, positively preventing significant inward radial movement of said thrust ring.

3. A coupling as set forth in claim 2, wherein said groove and segments have a configuration to permit each of said segments to be assembled into said groove with radial movement from the interior of the body while avoiding significant gaps between said segments adjacent said packing when finally positioned in said groove.

4. A coupling as set forth in claim 3, wherein at least one of said thrust ring segments is formed with a notch at one of its arcuate ends on a side away from said packing having a configuration which locally reduces its axial length to allow its assembly into said groove as a final segment while correspondingly reducing the required axial length of the groove necessary to allow full passage of said arcuate end radially into said groove.

5. A pipe coupling comprising a circumferentially continuous annular body, the body having a circular bore for receiving the end of a pipe, an annular packing groove in the body concentric about the circular bore, means for retaining the pipe end in the bore, a deformable packing in the groove, a plurality of arcuate thrust ring segments disposed in said groove and collectively forming an annular thrust ring in the body adjacent the packing, means on the body operable externally of the body for axially jacking the thrust ring towards the packing to axially compress the packing and thereby cause it to constrict radially about the exterior of the pipe and thereby effect a seal therewith, said groove and segments having a configuration to permit each of said segments to be assembled into said groove with radial movement from the interior of the body while avoiding significant gaps between said segments adjacent said packing when finally positioned in said groove, at least one of said segments being formed with a notch at one of its arcuate ends on a side away from said packing and having a configuration which locally reduces its axial length to allow its assembly into said groove as a final segment while correspondingly reducing the required axial length of the groove necessary to allow full passage of said arcuate end radially into said groove, and means on the body rendered effective and ineffective with the presence or absence respectively of the packing in the groove for mechanically interlocking the segments in the body.

* * * * *